(12) United States Patent
Resconi et al.

(10) Patent No.: US 10,851,191 B2
(45) Date of Patent: *Dec. 1, 2020

(54) PROCESS FOR PREPARING PROPYLENE POLYMER COMPOSITIONS

(71) Applicant: BOREALIS AG, Vienna (AT)

(72) Inventors: Luigi Resconi, Neuhofen an der Krems (AT); Pavel Shutov, Linz (AT); Wilfried Toltsch, Marchtrenk (AT)

(73) Assignee: BOREALIS AG (AT)

( * ) Notice: Subject to any disclaimer, the term of this patent is extended or adjusted under 35 U.S.C. 154(b) by 59 days.

This patent is subject to a terminal disclaimer.

(21) Appl. No.: 15/580,260

(22) PCT Filed: Jun. 29, 2016

(86) PCT No.: PCT/EP2016/065139
§ 371 (c)(1),
(2) Date: Dec. 6, 2017

(87) PCT Pub. No.: WO2017/001474
PCT Pub. Date: Jan. 5, 2017

(65) Prior Publication Data
US 2018/0134826 A1 May 17, 2018

(30) Foreign Application Priority Data
Jun. 30, 2015 (EP) ..................................... 15174603

(51) Int. Cl.
*C08F 210/06* (2006.01)
*C08F 210/16* (2006.01)

(52) U.S. Cl.
CPC .......... *C08F 210/06* (2013.01); *C08F 210/16* (2013.01); *C08F 2800/20* (2013.01)

(58) Field of Classification Search
USPC ......................................................... 526/916
See application file for complete search history.

(56) References Cited

U.S. PATENT DOCUMENTS

| 5,965,478 | A | * | 10/1999 | Goto ....................... | C08F 10/00 502/127 |
| 6,221,984 | B1 | * | 4/2001 | Kersting ................. | C08F 10/00 502/104 |
| 7,208,435 | B2 | * | 4/2007 | Hosaka ................... | C08F 10/00 502/102 |
| 9,790,291 | B2 | | 10/2017 | Xu et al. | |
| 2016/0311951 | A1 | * | 10/2016 | Reichelt ................ | B32B 27/32 |
| 2019/0002610 | A1 | * | 1/2019 | Toltsch ................. | C08F 210/06 |

FOREIGN PATENT DOCUMENTS

| EP | 0250229 | B2 | 12/1987 | | |
| EP | 0491566 | B2 | 9/1992 | | |
| EP | 0501741 | B1 | 9/1992 | | |
| EP | 0586390 | B1 | 3/1994 | | |
| EP | 0591224 | B1 | 4/1994 | | |
| EP | 0752431 | B1 | 2/1997 | | |
| EP | 0773235 | B1 | 5/1997 | | |
| EP | 1197497 | B1 | 4/2002 | | |
| EP | 2558508 | B1 | 2/2013 | | |
| EP | 2610271 | A1 | 7/2013 | | |
| EP | 2610272 | B1 | 7/2013 | | |
| EP | 2778182 | A1 | * | 9/2014 | ........... G08F 210/16 |
| TW | 576841 | B | | 2/2004 | |
| WO | 98/58971 | A1 | | 12/1998 | |
| WO | 2003/000754 | A1 | | 1/2003 | |
| WO | 2003/000757 | A1 | | 1/2003 | |
| WO | 2004/029112 | A1 | | 4/2004 | |
| WO | 2006/10429 | A1 | | 2/2006 | |
| WO | 2006/104297 | A1 | | 10/2006 | |
| WO | 2007/137853 | A1 | | 12/2007 | |
| WO | 2009/019169 | A1 | | 2/2009 | |
| WO | 2009/077287 | A1 | | 6/2009 | |
| WO | 2012/007430 | A1 | | 1/2012 | |

OTHER PUBLICATIONS

Abiru, Toshinobu, et al. "Microstructural Characterization of Propylene-Butene-1 Copolymer Using Temperature Rising Elution Fractionation" Journal of Application Polymer Science, vol. 68, 1493-1501, 1998.

Cimmino, S., et al., "Thermal and Mechanical properties of isotactic random propylene-butene-1 copolymers", Polymer, Oct. 1978, vol. 19. pp. 1222-1223.

Collina, G., et al., "Propene-co-butene random copolymers synthesized with superactive Ziegler-Natta catalyst", Journal of Molecular Catalysis A: Chemical 99 (1995) 161-165.

Crispino, Luigi, et al., "Influence of Composition on the Melt Crystallization of Isotactic Random Propylene/1-Butene Copolymers", Makromol. Chem. 181, 1747-1755, 1980.

(Continued)

*Primary Examiner* — Fred M Teskin
(74) *Attorney, Agent, or Firm* — Tarolli, Sundheim, Covell & Tummino LLP

(57) ABSTRACT

The present invention relates to an olefin polymerization process, wherein propylene and a C4 to C10 a-olefin, preferably 1-butene and optionally ethylene are reacted in the presence of a Ziegler-Natta catalyst so as to obtain a polypropylene, wherein the polypropylene comprises C4 to C10 a-olefin, preferably 1-butene-derived comonomer units in an amount of from 0.5 wt % to 15 wt % and ethylene-derived comonomer units in an amount of 0 wt % to 3 wt %, and wherein the Ziegler-Natta catalyst comprises i) an external donor of the formula (I): $(R^3)_z(R^2O)_ySi(R^1)x$ and ii) a solid Ziegler-Natta catalyst component being free of external carrier material.

8 Claims, No Drawings

(56) References Cited

OTHER PUBLICATIONS

International Report on Patentability dated Aug. 25, 2017.
Chinese Office Action for Application No. 201680027010.1 dated Jul. 1, 2020.

* cited by examiner

PROCESS FOR PREPARING PROPYLENE POLYMER COMPOSITIONS

The present invention relates to an olefin polymerization process, wherein propylene and an α-olefin of 4 to 10 C atoms and optionally ethylene are reacted in the presence of a Ziegler-Natta catalyst comprising an external donor. Further, the invention is directed to the propylene polymer compositions prepared from the process of the invention and use of said propylene polymer compositions for producing articles.

Good comonomer incorporation, i.e. good comonomer conversion and comonomer response are desired to reach better process economics and to avoid the need of extensive after-treatment steps for removing residual hydrocarbons. Especially higher monomers containing four or more carbon atoms tend to be less reactive and thus cause problems, like deterioration in organoleptic properties of the polymer. However, using such monomers is on the other hand advantageous for many polymer properties.

Polypropylenes are suitable for many applications. It is known that polypropylene comprising comonomer units derived from a higher alpha-olefin (such as 1-butene or 1-hexene) and optionally ethylene-derived comonomer units is useful for preparing polypropylene films such as blown films, cast films and polymer layers for multilayer films. Among other articles, flexible packaging can be prepared from such polypropylene materials.

A polypropylene having comonomer units of a higher alpha-olefin (e.g. a $C_{4-10}$ alpha-olefin) and optionally ethylene comonomer units can be prepared in the presence of a Ziegler-Natta catalyst. However, in order to have an efficient process, it is important that the catalyst has a high reactivity towards the $C_{4-10}$ alpha-olefin used as comonomer to ensure satisfactory process economics resulting in reduced need of the removal of non-reacted monomers from the polymer powder in an additional after-treatment step.

Typically, propylene is of higher reactivity than a $C_{4-10}$ alpha-olefin. Thus, for the preparation of propylene polymers having comonomer units derived from a higher alpha-olefin and optionally from ethylene, it is very important that the used catalyst has a sufficiently high reactivity towards the $C_{4-10}$ alpha-olefin component.

Depending on the final application, the polypropylene composition is subjected to further process steps such as extrusion or molding steps (e.g. cast molding, blow molding, extrusion coating etc.). The propylene polymer composition should have product properties which are consistent with the intended final application and have suitable processability in the desired process.

In many applications the polymer should have a low melting point (Tm). Low melting point is a beneficial feature e.g. in food packaging applications, where a polymer layer is used as a sealing layer. In some applications, e.g. on food packaging applications, too high sealing temperatures are to be avoided. Further, lower sealing temperatures require less energy in the sealing process. In order to have a low seal initiation temperature (SIT), the polymer should have low melting point (melt temperature).

Thus, a catalyst should comply with both requirements, i.e. having a high reactivity towards a $C_{4-10}$ α-olefin comonomer and enabling the preparation of propylene polymer composition comprising a $C_{4-10}$ α-olefin monomer and optionally ethylene and having low Tm.

In addition xylene solubles (XS) are desired to be on an acceptable low level in many applications.

Propylene polymer compositions, like propylene polymers comprising higher comonomers and optionally ethylene, are as such known in the art. However, there is an increased demand for improved or fine-tuned properties of the polymer and process.

Catalyst residues, especially catalyst carrier residues, like silica or $MgCl_2$ residues, might be harmful in final products, especially in film products.

WO9858971 discloses propylene terpolymer compositions comprising a mixture of two different terpolymer compositions. Polymer is produced in a process comprising a combination of slurry and gas phase reactors. A $MgCl_2$-supported Ziegler-Natta catalyst is used therein. Tm of the terpolymers is disclosed to be less than 133° C.

WO2009/019169 discloses a process for producing propylene terpolymer comprising as comonomers ethylene and an alpha-olefin of 4-8 C atom. Process is carried out in gas-phase reactor comprising two interconnected polymerization zones. A $MgCl_2$-supported Ziegler-Natta catalyst with dicyclopentyldimethoxysilane as external electron donor is used.

EP2558508 discloses a propylene-ethylene-hexene terpolymer produced by using a $MgCl_2$-supported Ziegler-Natta catalyst with dicyclopentyldimethoxysilane as external electron donor. The terpolymer produced is defined to have hexene content of 2 to 4 wt-% and ethene content of 1 to 2.5 wt-% and produced in two interconnected fluidized bed reactor.

WO 2009/077287 A1 describes a process for the preparation of polypropylene comprising 1-hexene derived comonomer units. The C3/C6 copolymer is prepared in the presence of a $MgCl_2$-supported Ziegler-Natta catalyst comprising an external donor such as thexyltrimethoxysilane. In comparative examples of WO 2009/077287 propylene-butene copolymers with 15 wt-% of butene were used in film preparation. However, no process or catalyst details are given for the polymers used in comparative film products.

G. Collina, L. Noristi, C. A. Stewart, J. Mol. Cat. A: Chem. 1995, 99, 161-165, discloses studies of stereospecificity of homo- and propylene-co-butene copolymers synthetized by using specific silanes as external donors.

EP 2778182 A1 describes a process for the preparation of propylene-based terpolymers and the terpolymers obtained thereby. A Ziegler-Natta catalyst supported on a $MgCl_2$ carrier and containing two internal donors in either a dual-zone single gas phase reactor or a two subsequent gas phase reactor setup optionally utilizing an external electron donor compound is employed therein. Diisopropyldimethoxysilane is used as an external electron donor in provided examples.

US 20030225224 A1 describes manufacture of propylene/pentene terpolymer in a gas phase process. A Ziegler-Natta catalyst supported on a $MgCl_2$ carrier is used. The most preferred external electron donors are mentioned to be dimethyldiethoxysilane, diethyldiethoxysilane, di-isopropyldimethoxysilane, diphenyldimethoxysilane, phenyltriethoxysilane, tetraethoxysilane.

In all prior art documents listed above, a catalyst supported on an external carrier is used.

As indicated above, there is room to improve the process for producing propylene polymer compositions comprising at least a C4 to C10 α-olefin in the presence of Ziegler-Natta catalysts to provide polymers with improved and desired properties, especially polymers with low Tm.

Recently there has been also increased demand to produce polymers without using any phthalate containing components. Especially in healthcare, food and medical industry such demands are of high priority.

In order to avoid use of external carrier material for producing solid catalyst components, a specific process for catalyst manufacturing has been developed. By modification of the preparation method of these types of catalysts, it is also possible to prepare solid catalyst components not containing any phthalate compounds. Catalysts and preparation thereof are described in e.g. WO 03/000754, WO 03/000757, WO 2007/077027, WO 2012/007430, EP2610271, EP261027 and EP2610272 which are incorporated here by reference.

Ziegler-Natta catalysts for producing propylene polymers comprise in addition to the solid catalyst component also co-catalysts, typically organoaluminum compounds, and typically external electron donors.

Alkoxysilane type compounds are typically used as an external electron donor in propylene (co)polymerization process, and are as such known and described in patent literature. For instance, EP0250229, WO2006104297, EP0773235, EP0501741 and EP0752431 disclose different alkoxysilanes used as external donors, which are suitable in polymerizing propylene.

Thus, it is an object of the present invention to provide a process for preparing a propylene polymer composition comprising comonomer units derived from an α-olefin of 4 to 10 C atoms, preferably from α-olefin of 4 to 6 C atoms, and optionally from ethylene. According to the process of the invention the comonomer of 4 to 10 C atoms is incorporated into the polymer chain at high yield, i.e. with a high conversion rate, and resulting in propylene polymer composition having a low melting temperature (Tm).

Particularly, the object of the present invention is to provide a process for preparing propylene polymer composition having comonomer units derived from 1-butene and optionally ethylene and having desired low Tm.

Further, an object of the present invention is to provide a propylene polymer composition obtainable preferably by the process of the invention and use thereof for producing articles.

Still, a further object of the present invention is to use the catalyst comprising a solid Ziegler-Natta catalyst component being free of external carrier and a specific external electron donor in a process for producing propylene polymer compositions as defined in the present application.

According to the first aspect of the present invention, the objective is solved by an olefin polymerization process, wherein propylene and an α-olefin comonomer of 4 to 10 C atoms, and optionally ethylene are co-polymerized in the presence of a Ziegler-Natta catalyst so as to obtain a propylene polymer composition, wherein the propylene polymer comprises an α-olefin of 4 to 10 C atoms-derived comonomer units in an amount of from 0.5 wt % to 15 wt % and ethylene-derived comonomer units in an amount of 0 wt % to 3 wt %, wherein the Ziegler-Natta catalyst comprises i) an external donor of the following formula (I)

$$(R^3)_z(R^2O)_y\text{Si}(R^1)_x \qquad (I)$$

wherein x is 1 or 2; y is 2 or 3; and z is 0 or 1; under the provision that x+y+z=4;

$R^1$ is an organic residue of the following formula (II)

wherein
the carbon atom bonded to the Si atom is a secondary carbon atom and the residues $R^4$ and $R^5$ bonded to the secondary carbon atom are, independently from each other, a $C_{1-2}$ alkyl group,
$R^2$ is a linear $C_{1-4}$ alkyl and
$R^3$ is a linear $C_{1-4}$ alkyl,
and
ii) a solid Ziegler-Natta catalyst component, which is free of any external carrier material.

Thus, the essential features of the present invention are to use in the polymerization process the specific external donor as defined above, and a solid Ziegler-Natta catalyst component, which is free of any external carrier.

The solid Ziegler-Natta catalyst component used in the present invention comprises a compound of Group 1 to 3 metal, a compound of a Group 4 to 6 transition metal (Nomenclature of Inorganic Chemistry, IUPAC 1988 and an internal electron donor. These components are not supported on an external support, as typically in prior art catalysts. Thus, the catalyst component is free of any external carrier material. The solid catalyst component used in the present invention is prepared by precipitation or emulsion-solidification method as described later in the application.

According to the process of the present invention, where copolymerization of propylene with an α-olefin comonomer of 4 to 10 C atoms and optionally with ethylene is carried out in the presence of a Ziegler-Natta catalyst comprising the specific external donor and the specific solid catalyst component as specified above, the α-olefin comonomer of 4 to 10 C atoms is very efficiently incorporated into the polymer chain, while achieving desirable product properties such as low Tm.

Furthermore, possible problems with carrier residues in e.g. film surfaces can be avoided.

As will be discussed below in further detail, a Ziegler-Natta catalyst comprising the specific silane compound of formula (I) acting as an external electron donor has a very high reactivity towards said higher comonomers. Thus, less α-olefin comonomer of 4 to 10 C atoms has to be fed to the polymerization reactor for accomplishing a certain content of α-olefin of 4 to 10 C atoms-derived comonomer units in the final polymer and/or less non-reacted α-olefin of 4 to 10 C atoms has to be removed from the polymer powder.

Preferably the α-olefin comonomer of 4 to 10 C atoms is an α-olefin comonomer of 4 to 6 C atoms, in particular 1-butene.

In the Formulas I and II, it is preferred that y is 2 or 3, z is 0, x is 1 or 2, $R^2$ is a linear $C_{1-4}$ alkyl, preferably methyl or ethyl, and $R^4$ and $R^5$ are methyl or ethyl.

More preferably, y is 2 or 3, z is 0, x is 1 or 2, $R^2$, $R^4$ and $R^5$ and $R^6$ are all methyl.

The terms external electron donor, external donor and donor have the same meaning in the present application and the terms are interchangeable.

As indicated above, the solid Ziegler-Natta catalyst component used in the present invention is a solid Ziegler-Natta catalyst comprising as essential components compounds of Group 1 to 3 metal and Group 4 to 6 transition metal and an internal electron donor and optionally a compound of Group 13 metal.

Suitable internal electron donors are, among others, 1,3-diethers, (di)esters of (di)carboxylic acids, like phthalates, maleates, substituted maleates, benzoates, and succinates or derivatives thereof. The internal electron donor is understood to mean a donor compound being part of the solid catalyst component, i.e. added during the synthesis of the catalyst component. The terms internal electron donor and internal donor have the same meaning in the present application and the terms are interchangeable.

Group 1 to 3 metal compound is preferably Group 2 metal compound, and especially a magnesium compound; Group 4 to 6 metal compound is preferably a Group 4 metal compound, more preferably a titanium compound, especially titanium tetrachloride, the optional Group 13 metal compound is preferably an aluminum compound.

The solid catalyst component used in the present invention is prepared according to the general procedure comprising: contacting a solution of Group 2 metal alkoxy compound with an internal electron donor or a precursor thereof and with at least one compound of a transition metal of Group 4 to 6 in an organic liquid medium, and obtaining the solid catalyst component particles.

According to one embodiment of the general procedure the solid catalyst component used in the present invention is prepared by the process comprising A. preparing a solution of Group 2 metal complex by reacting a Group 2 metal alkoxy compound and an electron donor or a precursor thereof in a reaction medium comprising $C_6$-$C_{10}$ aromatic liquid;

B. reacting said Group 2 metal complex with at least one compound of a transition metal of Group 4 to 6 and C. obtaining the solid catalyst component particles.

In the preferred embodiment the solid catalyst component used in the present invention is not only free of any external support (or carrier) material, but is also prepared without any phthalic compounds, like phthalates, typically used as internal donors or internal donor precursors.

Thus, according to one preferred embodiment the catalyst component containing no phthalic compounds, like phthalic acid derivatives is prepared according to the following procedure, which follows the general procedure above:

a) providing a solution of a$_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or a$_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or a$_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or a$_4$) Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$; $0 \leq m < 2$ and $n+m \leq 2$, provided that both n and m$\neq$0, $0 < n' \leq 2$ and $0 < m' \leq 2$; and b) adding said solution from step a) to at least one compound of a transition metal of Group 4 to 6 and c) obtaining the solid catalyst component particles, and adding a non-phthalate internal electron donor at any step prior to step c).

In this embodiment the internal donor is thus added to the solution of step a) or to the transition metal compound before adding the solution of step a) into said transition metal compound, or added after combining the solution of step a) with the transition metal compound.

According to the general procedures above the solid catalyst component can be obtained via precipitation method or via emulsion-solidification method depending on the physical conditions, especially temperature used in different contacting steps. In the present application, emulsion is also called liquid/liquid two-phase system.

The catalyst chemistry is independent on the selected preparation method, i.e. independent whether said precipitation or emulsion-solidification method is used.

In the precipitation method combination of the solution of step A) or a) with the at least one transition metal compound in step B) or b) is carried out, and the whole reaction mixture is kept, above 50° C., more preferably within the temperature range of 55 to 110° C., more preferably within the range of 70 to 100° C. to secure the full precipitation of the procatalyst in a form of solid particles in step C) or c).

In emulsion-solidification method in step B) or b) the solution of step A) or a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step C) or c)) of the droplets is suitably carried out by heating the emulsion to a temperature of 70 to 150° C., preferably to 80 to 110° C.

Preferably the Group 2 metal is magnesium and the transition metal compound of Group 4 is preferably a titanium compound, most preferably $TiCl_4$.

Preferred internal electron donors are (di)esters of aromatic (di)carboxylic acids. Said aromatic carboxylic acid ester or diester can be formed in situ by reaction of an aromatic carboxylic acid chloride or diacid chloride with a $C_2$-$C_{16}$ alkanol and/or diol, and is preferable di-2-ethylhexyl phthalate.

Preferred non-phthalic electron donors are (di)esters of non-phthalic carboxylic (di)acids, 1,3-diethers and derivatives thereof. Especially preferred non-phthalic donors are (di)esters of dicarboxylic acids, in particular (di)esters belonging to a group comprising malonates, maleates, substituted maleates, succinates, glutarates, cyclohexene-1,2-dicarboxylates and benzoates, and any derivatives thereof. More preferred examples are e.g. substituted maleates, most preferably citraconates.

In a preferred embodiment in step a) the solution of a$_2$) or a$_3$) are used, i.e. a solution of (Ax') or a solution of a mixture of (Ax) and (Bx).

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol, 1,3-propylene-glycol-monobutyl ether and 3-butoxy-2-propanol, more preferred alcohols (A) being 2-(2-ethylhexyloxy)ethanol, 1,3-propylene-glycolmonobutyl ether and 3-butoxy-2-propanol. A particularly preferred alcohol (A) is 3-butoxy-2-propanol.

Illustrative monohydric alcohols (B) are of formula ROH, with R being straight-chain or branched $C_2$-$C_{16}$ alkyl residue, preferably $C_4$ to $C_{10}$, more preferably $C_6$ to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step A) or a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solid particulate product obtained by precipitation or emulsion-solidification method may be washed at least once, preferably at least twice, most preferably at least three times with an aromatic and/or aliphatic hydrocarbons, preferably with toluene, heptane or pentane and/or with $TiCl_4$. Washing solutions can also contain additional amount of the internal donor used and/or compounds of Group 13 metal, preferably aluminum compounds of the formula $AlR_{3-n}X_n$, where R is an alkyl and/or an alkoxy group of 1 to 20, preferably of 1 to 10 carbon atoms, X is a halogen and n is 0, 1 or 2. Typical Al compounds comprise triethylaluminum and diethylaluminum chloride. Aluminum compounds can also be added during the catalyst synthesis at any step before the final recovery, e.g. in emulsion-solidification method the aluminum compound can be added and brought into contact with the droplets of the dispersed phase of the agitated emulsion.

The obtained catalyst component can further be dried, as by evaporation or flushing with nitrogen, or it can be slurried to an oily liquid without any drying step.

The finally obtained Ziegler-Natta catalyst component is desirably in the form of particles having generally a mean particle size range of 5 to 200 µm, preferably 10 to 100 µm.

Particles of the solid catalyst component have a surface area below 20 $g/m^2$, more preferably below 10 $g/m^2$, or even below the detection limit of 5 $g/m^2$.

Typically the amount of Ti is 1-6 wt %, amount of Mg is 10 to 20 wt % and amount of internal donor is 10 to 40 wt % in the solid catalyst component.

The catalyst component prepared by emulsion-solidification method is preferably used in the present invention. The catalyst component prepared by emulsion-solidification method is in the form of solid spherical particles having a low surface area being below 20 $g/m^2$, more preferably below 10 $g/m^2$. Said particles are also typically of compact with low porosity.

Furthermore, these catalysts are featured by a uniform distribution of catalytically active sites thorough the catalyst particles. The dispersed phase of the emulsion is in the form of liquid droplets and forms the catalyst part, which is transformed to solid catalyst particles during the solidification step as described above.

Catalyst components used in the present invention and preparation methods thereof are described e.g. in WO-A-2003/000757, WO-A-2003/000754, WO-A-2004/029112 and WO2007/137853. The catalyst components containing no phthalate compounds are disclosed in particular in e.g. WO 2012/007430, EP2610271, EP 261027 and EP2610272 which are incorporated here by reference. As indicated above, catalyst prepared without any phthalic compounds are preferred in the present invention.

As indicated above, the propylene polymer composition of the present invention comprises preferably C4 to C6 α-olefin, most preferably 1-butene-derived comonomer units in an amount of from 0.5 to 15 wt %. Preferably, the amount of 1-butene-derived comonomer units in the polypropylene is from 2 wt % to 12 wt %. In some preferred embodiments 1-butene content may be in the range of 3 wt % to 12 wt %, preferably from 4 wt % to 10 wt %.

The essential feature of the present invention is that the propylene polymer compositions have a low melting temperature (melting point). Melting temperature is typically dependent on the amount of comonomers, i.e. the melting temperature decreases, when the amount of comonomers increases. According to the present invention, where the polymer is produced using a catalyst comprising i) a specific external donor, as defined by the Formula I, and ii) a solid catalyst component being free of any external carrier material, and preferably being free of any phthalic compounds, the melting temperature of the polymer is lower compared to polymers having the same amount of comonomers, but prepared by using a catalyst, where the solid catalyst component and/or the external electron donor differ from the ones used in the present invention.

Melting temperatures of polymers having the same amount of comonomers, but produced according to the present invention are thus lower than of those polymers produced with the comparative method. In general melting temperatures below 151° C., preferably below 149° C. are achievable for copolymers of the invention. Terpolymers of the invention have typically still lower melting temperatures, even below 140° C.

As an additional benefit is that the amount xylene solubles (XS) can be kept on an acceptable low level for many application areas. Thus, XS values below 5 wt %, even below 4 wt %, are achievable when only 1-butene is used as comonomer. Such low XS values are achievable even with the 1-butene comonomer content above 6 wt %. In cases where ethylene is used as an additional comonomer, the XS values tend to be higher.

The propylene polymer composition prepared according to the process of the present invention is formed from propylene and from a comonomer selected from a $C_4$-$C_{10}$ α-olefin, preferably from a C4 to C8 α-olefin, more preferably from C4 to C6 α-olefin. Most preferably the α-olefin comonomer is 1-butene. Alternatively the comonomers are selected from α-olefin comonomers as disclosed above and ethylene, most preferably from 1-butene and ethylene. Thus the propylene polymer produced is most preferably propylene/1-butene comonomer or propylene/1-butene/ethylene terpolymer.

The polypropylene prepared by the process of the present invention may contain also ethylene-derived comonomer units in an amount of up to 3 wt %, more preferably 0.5 wt % to 2.5 wt %, like from 0.7 to 2.0 wt-%.

Preferably, the polypropylene has a melt flow rate $MFR_2$ of from 0.5 to 100 g/10 min, more preferably 1.0 to 50 g/10 min, measured according ISO1133 (230° C., 2.16 kg load). The final desired MFR is dependent on the targeted end application. MFR can be controlled in a manner known in the art e.g. by adjusting the hydrogen feed into the process.

In general, process conditions for polymerizing propylene and comonomers in the presence of a Ziegler-Natta catalyst are commonly known to the skilled person or can easily be established on the basis of common general knowledge.

As already mentioned above, using the specific silane compound of formula (I) as an external donor and a solid catalyst component being free of any external carrier in combination with 1-butene as the higher alpha-olefin comonomer does not only result in a very efficient comonomer incorporation but also makes it possible to produce propylene polymer compositions having beneficial product properties, especially lower Tm values vs. a given comonomer content of a polymer.

Apart from the specific external electron donor and a specific solid catalyst component as defined above, the Ziegler-Natta catalyst comprises typically an organometallic cocatalyst.

The organometallic cocatalyst may comprise at least one compound selected from a trialkylaluminum, a dialkyl aluminum chloride, an alkyl aluminum sesquichloride, or any mixture thereof. Preferably, alkyl is ethyl or isobutyl. Commonly used cocatalyst is triethyl aluminum.

In the Ziegler-Natta catalyst of the present invention, the molar ratio of aluminum (from the organometallic cocatalyst) to the transition metal of Group 4 to 6, preferably titanium, can vary over a broad range. Preferably, the molar ratio of aluminum to titanium in the Ziegler-Natta catalyst system is from 10 to 1000, more preferably from 50 to 500.

In the Ziegler-Natta catalyst of the present invention, the molar ratio of the external donor to the transition metal of Group 4 to 6, preferably titanium (from the solid Ziegler-Natta catalyst component) can vary over a broad range. Preferably, the molar ratio of the external donor to titanium in the Ziegler-Natta catalyst system is from 1 to 100, more preferably from 5 to 50.

The polymerization process for the production of the polypropylene may be a continuous process or a batch process utilising known methods and operating in liquid phase, optionally in the presence of an inert diluent, or in gas phase or by mixed liquid-gas techniques.

The polypropylene may be produced by a single- or multistage polymerisation process such as bulk polymerization, gas phase polymerization, slurry polymerization, solution polymerization or combinations thereof using the Ziegler-Natta catalyst as described above.

The polypropylene can be prepared e.g. in one or two slurry bulk reactors, preferably in loop reactor(s) or in a combination of one or two loop reactor(s) and at least one gas phase reactor. Those processes are well known to one skilled in the art.

If polymerization is performed in one or two loop reactors, the polymerization is preferably carried out in liquid propylene/1-butene mixtures at temperatures in the range from 20° C. to 100° C. Preferably, temperatures are in the range from 60° C. to 80° C. In case propylene/1-butene/ethylene terpolymer is produced, ethylene is also fed to any of the reactor(s). The pressure is preferably between 5 and 60 bar. The molecular weight of the polymer chains and thereby the melt flow rate of the polypropylene is regulated by adding hydrogen.

The process may also comprise an in-line prepolymerization step.

The catalyst may also be pre-polymerized off-line with monomers, e.g. with ethylene, propylene, or vinylcyclohexane. The off-line pre-polymerization degree (in gram of polymer per gram of catalyst) can be between 0.5 and 100, preferably between 1 and 50.

The in-line prepolymerization can be conducted as bulk slurry polymerization in liquid propylene or propylene/1-butene mixtures, i.e. the liquid phase mainly comprises propylene and optionally 1-butene, with a minor amount of other reactants and optionally inert components dissolved therein. The in-line polymerization step can be conducted in a separate pre-polymerization reactor preceding the actual polymerization reactors. It can also be conducted under prepolymerization conditions as a starting step in the first actual polymerization reactor.

The in-line prepolymerization reaction is typically conducted at a temperature of 0 to 50° C., preferably from 10 to 45° C.

If an in-line prepolymerisation step is carried out, it is possible that all catalyst components are introduced to the prepolymerization reactor. However, in principle, it is also possible that only a part of the cocatalyst is introduced into the prepolymerization stage and the remaining part into subsequent polymerization stages.

Hydrogen may be added into the prepolymerization stage to control the molecular weight of the prepolymer as is known in the art. Further, an antistatic additive may be used to prevent the particles from adhering to each other or to the walls of the reactor. The precise control of the prepolymerization conditions and reaction parameters is within the skill of the art.

According to a further aspect, the present invention relates to a polypropylene, which is obtainable by the process as described above.

With regard to the preferred properties of the propylene polymer composition, reference can be made to the statements already made above.

According to a further aspect, the present invention relates to a film, comprising the polypropylene as described above.

Preferably, the film is selected from a blown film, a cast film or a BOPP film. The film can be oriented, either mono-axially or bi-axially. Alternatively, the film can be non-oriented.

The film can be a layer, more preferably a sealing layer, in a multilayered biaxially oriented polypropylene (BOPP) film. So, according to another preferred embodiment, the present invention provides a multilayered biaxially oriented polypropylene (BOPP) film comprising a sealing layer which comprises the polypropylene as described above.

According to a further aspect, the present invention relates to a process for preparing a polypropylene film, which comprises preparing a propylene polymer composition by the polymerisation process described above, and processing the propylene polymer composition to a film.

The polypropylene composition can be processed to a film by commonly known methods such as blow moulding, cast moulding, and extrusion moulding.

According to a further aspect, the present invention relates to the use of a Ziegler-Natta catalyst which comprises i) an external donor of the following formula (I)

wherein x is 1 or 2; y is 2 or 3; and z is 0 or 1; under the provision that x+y+z=4;

$R^1$ is an organic residue of the following formula (II)

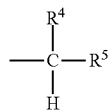

wherein the carbon atom bonded to the Si atom is a secondary carbon atom and the residues $R^4$ and $R^5$ bonded to the secondary carbon atom are, independently from each other, a $C_{1-2}$ alkyl group, $R^2$ is a linear $C_{1-4}$ alkyl and $R^3$ is a linear $C_{1-4}$ alkyl, and ii) a solid Ziegler-Natta catalyst component, which is free of any external carrier material, and the particles of the solid Ziegler-Natta catalyst component have a surface area below 20 m²/g for manufacturing a propylene polymer composition which comprises a C4 to C10 α-olefin, preferably 1-butene-derived comonomer units in an amount of from 0.5 to 15 wt % and ethylene-derived comonomer units in an amount of 0 wt % to 3 wt %.

In a preferred embodiment the solid Ziegler-Natta catalyst component is free of any external carrier material and is prepared without any phthalic compounds.

With regard to the preferred properties of the Ziegler-Natta catalyst and the propylene polymer composition, reference can be made to the statements provided above.

The present invention will now be described in further detail by the following Examples.

EXAMPLES

I. Measuring Methods

If not otherwise indicated, the parameters mentioned in the present application are measured by the methods outlined below.

1. Comonomer Content by IR Spectroscopy

The 1-butene content and, if present, the ethylene content of the copolymers or terpolymers has been measured by FTIR spectroscopy.

Comonomer content: The 1-butene content of the propylene-butene copolymer was determined by quantitative Fourier transform infrared spectroscopy (FTIR) as described in the following:

Before measuring, the stabilized powder was pressed in the IR press.

Press settings to homogenise the material:
press temperature: 210° C.
melting time: 90 sec
cooling rate: 12° C./min
de-moulding temperature: between 35 and 45° C.

| | step | |
|---|---|---|
| | 1 | 2 (cooling) |
| duration (sec.) | 90 | 900 |
| Temperature (° C.) | 210 | 30 |
| pressure (bar) | 0 | 0 |

Press settings for IR plate:
press temperature: 210° C.
melting time: 45 sec
press pressure: 3 steps (10/30/90 bar)
cooling rate: 12° C./min
de-moulding temperature: between 35 and 45° C.

| | step | | | | |
|---|---|---|---|---|---|
| | 1 | 2 | 3 | 4 | 5 (cooling) |
| duration (sec.) | 45 | 15 | 15 | 15 | 900 |
| Temperature (° C.) | 210 | 210 | 210 | 210 | 30 |
| pressure (bar) | 0 | 10 | 30 | 90 | 90 |

The films had a thickness of between 260 and 300 μm

Spectra recorded in transmission mode. Relevant instrument settings include a spectral window of 5000 to 400 wave-numbers (cm⁻¹), a resolution of 2.0 cm⁻¹ and 16 scans. The butene content of a propylene-butene copolymer was determined using the baseline corrected peak maxima of a quantitative band at 767 cm⁻¹, with the baseline defined from 1945 to 625 cm⁻¹. The comonomer content in mol % was determined using a film thickness method using the intensity of the quantitative band $I_{(767)}$ (absorbance value), and the thickness (T, in cm) of the pressed film using the following relationship:

$$\text{mol \% C4} = [(I_{(767)}/T) - 1.8496]/1.8233 \quad \text{(Equation 1)}$$

In case of a propylene-ethylene-butene terpolymer, the comonomer content was determined using the baseline corrected peak maxima at the quantitative bands at 767 cm⁻¹ for butane and at 732 cm⁻¹ for ethylene with the baseline defined from 1945 to 625 the ethylene. The comonomer content in mol % was determined using a film thickness method using the intensity of the quantitative bands ($I_{767}$ and $I_{732}$ absorbance values) and the thickness (T, in cm) of the pressed film using the following relationships:

$$\text{mol \% C4} = [(I_{767}/T) - 3.1484]/1.5555 \quad \text{(Equation 2)}$$

$$\text{mol \% C2} = [(I_{732}/T) - 0.6649)]/1.2511 \quad \text{(Equation 3)}$$

2. Amount of Xylene Solubles (XS, Wt %)

The amount of xylene solubles was determined based on the principles of ISO 16152; first edition; 2005-07-01. at 25° C., but using the following conditions: A weighed amount of a sample was dissolved under reflux conditions for 1 h. The solution was first cooled for 60 min at room temperature and then maintained at 25° C. for 200 min to achieve the complete crystallization of the insoluble fraction. After filtration and solvent evaporation the amount of xylene soluble fraction was gravimetrically determined.

3. MFR$_2$

Melt flow rate MFR$_2$ was measured according to ISO 1133 (230° C., 2.16 kg load).

4. Melting Temperature

The melting points (Tm) were determined according to ISO standards 11357 on a DSC Q2000 TA Instrument, by placing a 5-7 mg polymer sample, into a closed DSC aluminum pan, heating the sample from −10° C. to 225° C. at 10° C./min, holding for 10 min at 225° C., cooling from 225° C. to −10° C., holding for 5 min at −10° C., heating from −10° C. to 225° C. at 10° C./min. The reported values are those of the peak of the endothermic heat flow determined from the second heating scan.

5. ICP Analysis

The elemental analysis of a catalyst was performed by taking a solid sample of mass, M, cooling over dry ice. Samples were diluted up to a known volume, V, by dissolving in nitric acid (HNO$_3$, 65%, 5% of V) and freshly deionised (DI) water (5% of V). The solution was further diluted with DI water up to the final volume, V, and left to stabilize for two hours.

The analysis was run at room temperature using a Thermo Elemental iCAP 6300 Inductively Coupled Plasma-Optical Emmision Spectrometer (ICP-OES) which was calibrated using a blank (a solution of 5% HNO$_3$), and standards of 0.5 ppm, 1 ppm, 10 ppm, 50 ppm, 100 ppm and 300 ppm of Al, Mg and Ti in solutions of 5% HNO$_3$.

Immediately before analysis the calibration is 'resloped' using the blank and 100 ppm standard, a quality control sample (20 ppm Al, Mg and Ti in a solution of 5% HNO$_3$ in DI water) is run to confirm the reslope. The QC sample is also run after every 5$^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

6. Surface Area:

BET with N$_2$ gas ASTM D 3663, apparatus Micromeritics Tristar 3000: sample preparation at a temperature of 50° C., 6 hours in vacuum.

7. Pore volume was measured according to ASTM 4641.

8. Mean particle size is given in μm and measured with Coulter Counter LS200 at room temperature with n-heptane as medium. The given mean particle size is arithmetic mean size and is based on volumetric amount.

II. Examples

In the Inventive Examples, the following external donors were used:

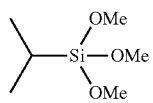

iso-propyltrimethoxysilane, marked in the examples as donor I. CAS no 14346-37-3.

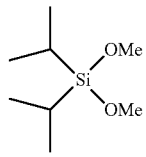

di-iso-propyldimethoxysilane, marked in the examples as donor P. CAS no 18230-61-0

In the Comparative Examples, the following external donor was used: dicyclopentyldimethoxysilane, marked in the examples as D. CAS no 126990-35-0.

The following Ziegler-Natta catalyst components were used in the Examples:

Catalyst 1

The solid catalyst component was prepared by emulsion-solidification method as follows:

3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times: Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml of toluene.

Wash 4: Washing was made with 60 ml of heptane.

Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by N$_2$ sparging for 20 minutes to yield an air sensitive powder.

Two batches of catalyst were prepared.

Catalyst 1A and 1B having the following Ti and Mg amounts, measured by IPC:

1A: Ti content 3.8 wt-%, Mg content 15.0
1B: Ti content 4.0 wt-%, Mg content 14.0

The catalysts were prepared without any phthalic compounds. Surface area was <5 m$^2$/g (below the detection limit).

Catalyst 2 (Comparative)

MgCl$_2$ Supported Catalyst—Comparative Catalyst

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the catalyst was filtered and dried. Catalyst and its preparation concept is described in general e.g. in patent publications EP491566, EP591224 and EP586390. The amount of Ti in the catalyst was 1.9 wt-%.

Catalyst Preactivation:

Catalyst 1A

In the glove-box, the oil-slurry catalyst was well homogenized at least for 20 min by shaking. Then the chosen amount of the catalyst-oil slurry sample was drawn with a syringe and transferred into a 20 ml stainless steel vial with 10 ml heptane. 80% of the total TEA solution (0.62 molar solution in heptane, provided by Chemtura) and the whole donor amount (0.3 molar solution in heptane) were mixed for 5 minutes in an appropriate syringe and injected into the catalyst vial which was then mounted on the autoclave.

Catalyst 1B and Catalyst 2

Dry Catalyst (Oil Slurry Washed with Heptane and Dried).

The solid dry catalyst was contacted with 0.8 ml white oil over night in the glove box and then transferred with heptane in the catalyst feeder. The subsequent steps are similar as those used for the oil slurries.

Polymerizations:

In all Examples, triethylaluminum (TEA) was used as the organometallic cocatalyst.

Propylene-Butene Copolymerisation

A stirred bench-scale autoclave reactor equipped with a ribbon stirrer, with a volume of 21,2-L containing 0.2 bar-g propylene pressure was filled with 3.45 kg propylene and the desired amount of 1-butene. Afterwards 20% of the total amount of TEA was injected from a stainless-steel vessel having a total volume of about 2 ml. This vessel was mounted on the reactor and the solution was injected into the reactor by flushing with 250 g propylene. The desired amount of hydrogen was added via mass flow controller (MFC). The solution was stirred at 20° C. and 250 rpm. The catalyst vessel (catalyst feeder) was mounted on the reactor. After a total contact time of 5 min between the oil catalyst slurry in heptane and the TEA/Donor solution, the catalyst slurry was injected by means of flushing with 250 g propylene. TEA/Donor molar ratio was 10. Pre-polymerisation was run for 10 min. The polymerisation temperature was then increased to 75° C.) and kept constant throughout the entire polymerisation experiment. The reactor pressure was also kept constant by feeding propylene throughout the polymerisation experiment at 75° C. The polymerisation time was measured starting from the moment when the temperature reached 73° C. After 1 hour the reaction was stopped by injecting 5 ml methanol, cooling the reactor and flashing the volatile components.

After purging the reactor twice with N2 and one vacuum/N2 flashing cycle, the product was taken out and dried overnight in a fume hood. 100 g of the polymer was additivated with 0.2 wt % Ionol and 0.1 wt % PEPQ (dissolved in acetone) and then dried overnight in a fume hood and additionally for 2 hours in a vacuum drying oven at 60° C.

Propylene-1-Butene-Ethylene Terpolymerisation

A stirred bench scale autoclave reactor equipped with a ribbon stirrer, with a volume of 21,2-L containing 0.2 bar-g propylene pressure was filled with 3.45 kg propylene and the desired amount of 1-butene (see tables). Afterwards 20% of the total amount of TEA was injected from a stainless-steel vessel having a total volume of about 2 ml. This vessel was mounted on the reactor and the solution was injected into the reactor by flushing with 250 g propylene. After a contact time of about 20 min between TEA and the monomers (at 20° C., 250 rpm), the catalyst vessel (catalyst feeder) was mounted on the reactor. The desired amount of hydrogen was added via mass flow controller (MFC). The solution was stirred at 250 rpm and 20° C. After a total contact time of 5 min between the catalyst oil slurry and the TEAL/Donor solution in the catalyst feeder, the suspension was injected by flushing with 250 g propylene. TEA/Donor molar ratio was 10. Stirring speed was kept at 250 rpm and pre-polymerisation was run for 10 minutes at 20° C. The polymerisation temperature was then increased to 70° C. and held constant throughout the entire polymerisation. During the reactor heating-up phase, a defined amount of ethylene was added. The polymerisation time was measured starting from the moment when the reactor temperature reached 68° C. Ethylene was dosed continuously via MFC at a fixed rate and the reactor pressure was kept constant by feeding propylene and ethylene throughout the entire polymerisation experiment at 70° C.

After 1 hour, the reaction was stopped by adding 5 ml methanol, cooling the reactor and flashing the volatile components. After purging the reactor twice with N2 and one vacuum/N2 flashing cycle, the product was taken out and dried overnight in a fume hood. 100 g of the polymer was additivated with 0.2 wt % Ionol and 0.1 wt % PEPQ (dissolved in acetone) and then dried overnight in a fume hood and additionally for 2 hours in a vacuum drying oven at 60° C.

Calculations:

The calculations for the C4 concentrations in the liquid phase were done by using the Aspen General VLE 8.2 model RRT. The C4 concentration values used to estimate the reactivity ratio R was calculated according to the following equation:

$$\text{Ratio C4/C3 w/w in liquid phase} = (\text{ratio C4/C3 w/w at start} + \text{ratio C4/C3 w/w at end of the experiment})/2$$

The reactivity ratio R was calculated according to the following Equation:

$$\text{Reactivity Ratio R} = (\text{ratio C4/C3 w/w in polymer})/(\text{ratio C4/C3 w/w in liquid phase})$$

Polymerisation Examples

The polymerization conditions and polymer properties are shown in Tables 1 to 4.

In Tables 1 and 2 polymerisation conditions and results of propylene-1-butene copolymerisations of Comparative examples 1 to 5 (CE1-CE5) and Inventive examples 1 to 6 (IE1 to IE6) are disclosed.

In Tables 3 (3a and 3b) and 4 polymerisation conditions and results of propylene-1-butene-ethylene copolymerisations of Comparative example 6 (CE6) and Inventive example 7 (IE7) are disclosed.

TABLE 1

Polymerization conditions in propylene-1-butene copolymerisations

| Example | Catalyst comp. | External donor | Al total mmol | Al/Ti mol/mol | Donor/Ti mol/mol | Average calculated C4/C3 ratio in liquid phase wt/wt | H2 in bulk NL |
|---|---|---|---|---|---|---|---|
| CE1 | 2 | D | 2.4 | 250 | 25 | 0.33 | 27 |
| CE2 | 2 | D | 2.5 | 250 | 25 | 0.54 | 27 |
| CE3 | 1A | D | 4.5 | 200 | 20 | 0.25 | 15 |
| CE4 | 1A | D | 4.5 | 200 | 20 | 0.33 | 15 |
| CE5 | 1A | D | 4.8 | 200 | 20 | 0.42 | 15 |
| IE1 | 1B | P | 6.9 | 200 | 20 | 0.20 | 10 |
| IE2 | 1B | P | 6.6 | 200 | 20 | 0.16 | 10 |
| IE3 | 1B | P | 6.6 | 200 | 20 | 0.32 | 10 |
| IE4 | 1A | I | 6.0 | 200 | 20 | 0.29 | 13 |
| IE5 | 1B | I | 6.6 | 200 | 20 | 0.22 | 6 |
| IE6 | 1B | I | 6.6 | 200 | 20 | 0.16 | 6 |

TABLE 2

Polymer properties of propylene-1-butene copolymerisations

| Example | $MFR_2$ g/10 min | C4 total (IR) wt % | C4/C3 ratio in polymer wt/wt | R | $T_m$ °C. | XS wt % |
|---|---|---|---|---|---|---|
| CE1 | 9 | 6.1 | 0.065 | 0.20 | 148.6 | 2.3 |
| CE2 | 11 | 8.7 | 0.096 | 0.18 | 143.3 | 3.0 |
| CE3 | 7 | 4.6 | 0.048 | 0.19 | 151.0 | 2.3 |
| CE4 | 7 | 5.7 | 0.060 | 0.18 | 147.3 | 2.6 |
| CE5 | 9 | 6.7 | 0.072 | 0.17 | 145.8 | 2.8 |
| IE1 | 9 | 5.8 | 0.061 | 0.30 | 146.2 | 3.3 |
| IE2 | 8 | 4.5 | 0.047 | 0.30 | 149.4 | 3.1 |
| IE3 | 10 | 8.6 | 0.094 | 0.29 | 139.4 | 3.9 |
| IE4 | 21 | 8.4 | 0.092 | 0.32 | 140.7 | 3.0 |
| IE5 | 6 | 6.1 | 0.064 | 0.30 | 145.3 | 2.3 |
| IE6 | 7 | 4.3 | 0.044 | 0.28 | 148.9 | 2.6 |

TABLE 3a

Polymerization conditions (catalyst) in propylene-1-butene-ethylene terpolymerisations

| Example # | Catalyst | External Donor | Catalyst amount mg | TEA solution in precontact (0.62 molar in C7) ml | Total TEA solution (0.62 molar in C7) ml | Donor amount (0.3 molar) ml | TEA solution in purification step mmol | Al/Ti mol/mol | Donor/Ti mol/mol |
|---|---|---|---|---|---|---|---|---|---|
| CE6 | 1A | D | 58.1 | 7.98 | 9.97 | 2.06 | 1.237 | 200 | 20 |
| IE7 | 1A | P | 65.5 | 8.99 | 11.24 | 2.32 | 1.394 | 200 | 20 |

TABLE 3b

Polymerization conditions in propylene-1-butene-ethylene terpolymerisations

| Example # | H2 NL | C3 dosed to keep pressure constant g | C3 total from scale g | C3 total from scale and flow control g | C4 total from scale g | C2 feed const flow transistion g | C2 feed batch g | C2 feed total g | average calculated C4/C3 wt-ratio in liquid phase g/g | average calculated C4/(C3 + C4) wt-ratio in liquid phase wt % | yield g | Catalyst activity kgPP/gcat/h |
|---|---|---|---|---|---|---|---|---|---|---|---|---|
| CE6 | 15 | 1291 | 3965 | 5256 | 927 | 8 | 15 | 23 | 0.27 | 21.26 | 2323 | 40.0 |
| IE7 | 9 | 1182 | 3965 | 5147 | 927 | 8 | 15 | 23 | 0.26 | 20.70 | 2139 | 32.5 |

TABLE 4

Polymer properties of propylene-1-butene-ethylene terpolymerisations and 1-butene reactivity ratio R

| Example | External Donor | MFR2 g/10 min | Bulk density g/ml | XS wt % | C4 (IR) wt % | C2 (IR) wt % | R (C4/C3) | $T_m$ °C. | $T_c$ °C. | $M_w$ g/mol | $M_w/M_n$ |
|---|---|---|---|---|---|---|---|---|---|---|---|
| CE6 | D | 7.5 | 0.45 | 3.9 | 6.2 | 0.8 | 0.24 | 142.1 | 101.3 | 254500 | 7.1 |
| IE7 | P | 8.5 | 0.47 | 4.1 | 7.8 | 0.9 | 0.32 | 134.2 | 94.9 | 248500 | 5.8 |

When evaluating a catalyst for its copolymerization performance, the most useful parameter to determine is the relative comonomer reactivity ratio R, which is defined as indicated above. R is specific for a given catalyst and monomer pair and typically applies to the whole composition range. Since the concentration of 1-butene increases over the polymerization time while that of propylene decreases, there is a difference in liquid phase composition between start and end of the polymerisation experiment, despite the additional propylene fed to keep the pressure constant. For this reason, as liquid phase composition values, the average of the initial and final calculated values was used.

The values of R, determined for propylene-1-butene copolymerisations and propylene-1-butene-ethylene terpolymerisations with the Ziegler-Natta catalysts comprising external donor D in comparative examples and external donors P or I in inventive examples, are clearly higher for inventive examples indicating better 1-butene conversion in the polymerisation processes, where external donors P or I are employed.

In addition the results show that melting temperature of the copolymers produced according to the inventive methods are lower compared to polymers having a same amount of 1-butene comonomer, but produced according to the comparative examples. The same trend is seen in the terpolymer examples.

The correlation between comonomer content and melting point of propylene-1-butene copolymers is well known, see for example Cimmino, Martuscelli, Nicolais, Silvestre in Polymer 1978, 19, 1222; Crispino, Martuscelli, Pracella in Makromol Chem 1980, 181, 1747; Abiru, Mizuno, Weigand in J Appl Polym Sci 1998; 68:1493.

As demonstrated above, the Ziegler-Natta catalyst comprising the external donor as defined in the present invention and a solid catalyst component being free of any external carrier material has a very high reactivity for 1-butene, thereby requiring less 1-butene in the monomer feed. This means that less unreacted 1-butene has to be removed from the final polymer, with the operability advantage of reducing the degassing time, resulting in a higher throughput.

The invention claimed is:

1. An olefin polymerization process, wherein propylene and C4 to C10 α-olefin and optionally ethylene are reacted in the presence of a Ziegler-Natta catalyst so as to obtain a propylene polymer composition, wherein the polypropylene comprises C4 to C10 α-olefin-derived comonomer units in an amount of from 0.5 wt % to 15 wt % and ethylene-derived comonomer units in an amount of 0 wt % to 3 wt %, and the Ziegler-Natta catalyst comprises:

i) an external donor of the following formula (I):

$$(R^3)_z(R^2O)_y Si(R^1)_x \quad (I)$$

wherein:

x is 1 or 2; y is 2 or 3; and z is 0 or 1; under the provision that x+y+z=4;

$R^1$ is an organic residue of the following formula (II)

(II)

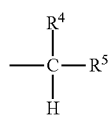

wherein, the carbon atom bonded to the Si atom is a secondary carbon atom and the residues $R^4$ and $R^5$ bonded to the secondary carbon atom are, independently from each other, a $C_{1-2}$ alkyl group, $R^2$ is a linear $C_{1-4}$ alkyl and $R^3$ is a linear $C_{1-4}$ alkyl, and ii) a solid Ziegler-Natta catalyst component, which is free of any external carrier material; wherein the solid Ziegler-Natta catalyst component ii) is prepared according to the procedure comprising:

a) providing a solution of $a_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or $a_2$) at least a Group 2 metal alkoxy compound (Ax') being the reaction product of a Group 2 metal compound and an alcohol mixture of the alcohol (A) and a monohydric alcohol (B) of formula ROH, with R being a straight-chain or branched $C_2$-$C_{16}$ alkyl residue, optionally in an organic liquid reaction medium; or $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or $a_4$) Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and 0≤n<2; 0≤m<2 and n+m≤2, provided that both n and m≠0, 0<n'≤2 and 0<m'≤2; and b) adding said solution from step a) to at least one compound of a transition metal of Group 4 to 6 and c) obtaining the solid catalyst component particles, and adding a non-phthalic internal electron donor at any step prior to step c).

2. The process according to claim 1, wherein y is 2 or 3, z is 0, $R^2$ is a linear $C_{1-4}$ alkyl.

3. The process according to claim 1, wherein the amount of C4 to C10 α-olefin-derived comonomer units in the polypropylene composition is from 2 wt % to 12 wt % and the amount of the ethylene-derived comonomer units is from 0 wt % to 2.5 wt %.

4. The process according to claim 1, wherein the propylene polymer composition is a propylene-1-butene copolymer or propylene-1-butene-ethylene terpolymer.

5. The process according to claim 1, wherein the propylene polymer composition is prepared in a process comprising a liquid phase polymerization.

6. The process according to claim 1, wherein the particles of the solid Ziegler-Natta catalyst component ii) have a surface area less than 20 m²/g.

7. The process according to claim 1, wherein the solid Ziegler-Natta catalyst component ii) is obtainable or obtained by a precipitation or emulsion-solidification method.

8. The process according to claim 1, wherein the process of preparing the solid Ziegler-Natta catalyst component ii) where no external carrier material is used and further comprises the steps:

preparing a solution of Group 2 metal complex by reacting the solution from step a) and the non-phthalic internal electron donor or a precursor thereof in a reaction medium comprising $C_6$-$C_{10}$ aromatic liquid;

reacting said Group 2 metal complex with at least one compound of a transition metal of Group 4 to 6 and obtaining the solid catalyst component particles.

* * * * *